US011092959B2

(12) United States Patent
Yang et al.

(10) Patent No.: US 11,092,959 B2
(45) Date of Patent: Aug. 17, 2021

(54) METHOD AND APPARATUS FOR DATA TRANSMISSION

(71) Applicant: SZ DJI TECHNOLOGY CO., LTD., Shenzhen (CN)

(72) Inventors: Shuo Yang, Shenzhen (CN); Jiahang Ying, Shenzhen (CN); Zhaoliang Peng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 10 days.

(21) Appl. No.: 15/986,615

(22) Filed: May 22, 2018

(65) Prior Publication Data

US 2018/0267529 A1    Sep. 20, 2018

Related U.S. Application Data

(63) Continuation of application No. PCT/CN2015/095305, filed on Nov. 23, 2015.

(51) Int. Cl.
*G05D 1/00* (2006.01)
*G08C 17/02* (2006.01)
(Continued)

(52) U.S. Cl.
CPC ......... *G05D 1/0038* (2013.01); *G05D 1/0022* (2013.01); *G08C 17/00* (2013.01);
(Continued)

(58) Field of Classification Search
CPC .................................................. G05D 1/0038
(Continued)

(56) References Cited

U.S. PATENT DOCUMENTS 5,068,654 A * 11/1991 Husher ............... G08G 1/161
455/502
7,532,901 B1 * 5/2009 LaFranchise ....... H04M 1/6066
178/19.04
(Continued)

FOREIGN PATENT DOCUMENTS

CN    101913427 A  * 12/2010
CN    101913427 B  *  1/2013
(Continued)

OTHER PUBLICATIONS

Google Translation of Chinese Patent Application Pub No. US 103744390 B that published in 2014 (hereinafter "the 390 publication").*

(Continued)

*Primary Examiner* — Jean Paul Cass
(74) *Attorney, Agent, or Firm* — Anova Law Group, PLLC

(57) ABSTRACT

A method for data transmission includes receiving, by a controller of an unmanned aerial vehicle (UAV), target data from a transmitting terminal. The transmitting terminal includes a ground control apparatus or an onboard device of the UAV. The onboard device is connected with the UAV via a universal interface of the UAV. The universal interface is configured to connect onboard devices of various types. The method further includes forwarding the target data to a receiving terminal. The receiving terminal includes the ground control apparatus or the onboard device, and the receiving terminal is different from the transmitting terminal.

17 Claims, 4 Drawing Sheets

(51) Int. Cl.
G08C 17/00 (2006.01)
H04L 29/08 (2006.01)
G08G 5/00 (2006.01)
B64C 39/02 (2006.01)

(52) U.S. Cl.
CPC ........... G08C 17/02 (2013.01); G08G 5/0069 (2013.01); H04L 67/00 (2013.01); H04L 67/2814 (2013.01); B64C 39/024 (2013.01); B64C 2201/146 (2013.01)

(58) Field of Classification Search
USPC ............................................................. 701/2
See application file for complete search history.

(56) References Cited

U.S. PATENT DOCUMENTS

| | | | |
|---|---|---|---|
| 9,705,561 B2* | 7/2017 | Henry | H04B 3/52 |
| 9,749,053 B2* | 8/2017 | Henry | H02J 13/00017 |
| 9,787,412 B2* | 10/2017 | Henry | H01Q 13/22 |
| 9,800,327 B2* | 10/2017 | Gerszberg | H04B 3/56 |
| 9,820,146 B2* | 11/2017 | Gross | H04B 3/52 |
| 9,836,957 B2* | 12/2017 | Gerszberg | H04B 10/25 |
| 9,838,078 B2* | 12/2017 | Bennett | H04B 3/50 |
| 9,838,896 B1* | 12/2017 | Barnickel | H04W 4/026 |
| 9,847,566 B2* | 12/2017 | Henry | H01P 1/222 |
| 9,860,075 B1* | 1/2018 | Gerszberg | H04L 12/2878 |
| 9,865,911 B2* | 1/2018 | Henry | H01P 1/16 |
| 9,871,282 B2* | 1/2018 | Henry | H01P 1/042 |
| 9,876,264 B2* | 1/2018 | Barnickel | H01P 1/10 |
| 9,876,605 B1* | 1/2018 | Henry | H04L 1/0025 |
| 9,882,257 B2* | 1/2018 | Henry | H04B 3/54 |
| 9,882,277 B2* | 1/2018 | Henry | H01Q 13/02 |
| 9,887,447 B2* | 2/2018 | Henry | H04B 3/54 |
| 9,893,795 B1* | 2/2018 | Henry | H05K 999/99 |
| 9,904,535 B2* | 2/2018 | Gross | H04B 3/52 |
| 9,911,020 B1* | 3/2018 | Liu | G06K 7/10366 |
| 2006/0200278 A1* | 9/2006 | Feintuch | G06F 11/1487 |
| | | | 701/3 |
| 2007/0093945 A1 | 4/2007 | Grzywna et al. | |
| 2008/0221825 A1* | 9/2008 | Nyffenegger | G01D 5/268 |
| | | | 702/122 |
| 2012/0141066 A1* | 6/2012 | Tournier | G02B 6/4246 |
| | | | 385/24 |
| 2013/0252563 A1* | 9/2013 | Peterson | H04B 1/48 |
| | | | 455/83 |
| 2014/0218255 A1* | 8/2014 | Sanford | H01Q 19/134 |
| | | | 343/837 |
| 2017/0170900 A1* | 6/2017 | Petrucci | H04B 10/0775 |
| 2017/0327091 A1* | 11/2017 | Capizzo | B60S 5/02 |
| 2018/0219611 A1* | 8/2018 | Hudson | G05D 1/106 |
| 2018/0227040 A1* | 8/2018 | Hudson | G05D 1/0022 |
| 2018/0267529 A1* | 9/2018 | Yang | G08C 17/02 |
| 2019/0028172 A1* | 1/2019 | Hudson | H04B 7/0469 |
| 2019/0154439 A1* | 5/2019 | Binder | G01S 15/08 |
| 2019/0364492 A1* | 11/2019 | Azizi | H04W 52/0264 |
| 2020/0225684 A1* | 7/2020 | Anderson | G05D 1/0022 |
| 2020/0229206 A1* | 7/2020 | Badic | H04W 4/023 |
| 2021/0089040 A1* | 3/2021 | Ebrahimi Afrouzi | |
| | | | B25J 9/1697 |

FOREIGN PATENT DOCUMENTS

| | | | |
|---|---|---|---|
| CN | 103744390 A | | 4/2014 |
| CN | 104538899 A | | 4/2015 |
| CN | 104656660 A | | 5/2015 |
| CN | 104808675 A | | 7/2015 |
| CN | 104820431 A | * | 8/2015 |
| CN | 104950906 A | | 9/2015 |
| CN | 104977912 A | | 10/2015 |

OTHER PUBLICATIONS

Google Translate of Chinese Patent Application Pub. No. CN104820431A that published on Aug. 5, 2015.*
Google Translation of Chinese Patent Application Pub. No. CN101913427B that published in 2010.*
Branco, Kalinka, Pelizzoni, Jorge et al., Tiriba—A New Model Approach of UAV based on Model Driven Development and Multiprocessors, IEEE, ICRA Communications, 978-1-61284-380-3/11/$26.00© 2011 IEEE (https://ieeexplore.ieee.org/stamp/stamp.jsp?tp=&arnumber=5980581) (2011).*
Google Translation of Chinese Patent Application Pub No. US 104538899A.*
Google Translation of Chinese Patent Application Pub No. 104950906A.*
The World Intellectual Property Organization (WIPO) International Search Report for PCT/CN2015/095305 dated Aug. 10, 2016 5 Pages.

* cited by examiner

METHOD AND APPARATUS FOR DATA TRANSMISSION

CROSS-REFERENCE TO RELATED APPLICATION

This application is a continuation of International Application No. PCT/CN2015/095305, filed on Nov. 23, 2015, the entire contents of which are incorporated herein by reference.

TECHNICAL FIELD

The disclosure relates to aviation technology, and more particularly to a method and apparatus for data transmission.

BACKGROUND OF THE DISCLOSURE

Unmanned aerial vehicles (UAVs), also known as drones, have been widely used in various fields including military and agriculture applications. For example, the UAV can be used to perform various tasks including aerial photography, highway survey, border patrol, forest fire protection and disaster assessment.

The UAV can exchange data with a ground control apparatus. A delay may be found in data transmission due to a transmission distance, affecting a control of the UAV. Various devices can be provided onboard the UAV. An operational program of the onboard device can be preset, however, the ground control apparatus may not obtain an operating state of the program running on the onboard device. Therefore, the UAV may fly blind or even crash if the onboard device fails.

SUMMARY OF THE DISCLOSURE

The disclosure provides a method and an apparatus for data transmission to effect a data communication between an onboard device which is externally connected with an Unmanned Aerial Vehicle (UAV) and a ground control apparatus of the UAV, thereby controlling the UAV reliably.

An aspect of the disclosure provides a method for data transmission. The method can comprise: receiving, by a controller of a UAV, target data from a transmitting terminal, the transmitting terminal being a ground control apparatus or an onboard device of the UAV, the onboard device being connected with the UAV via a universal interface of the UAV, the universal interface being configured to connect various types of onboard devices; and forwarding the target data to a receiving terminal. The receiving terminal can be the ground control apparatus or the onboard device, and the receiving terminal is different from the transmitting terminal.

In some embodiments, the method can further comprise, before receiving, by a controller of a UAV, target data from a transmitting terminal, receiving a data transmission request from the transmitting terminal; and establishing a data transmission channel between the transmitting terminal and the controller in response to the data transmission request. In some instances, receiving the target data from the transmitting terminal can comprise receiving the target data from the transmitting terminal over the data transmission channel.

In some embodiments, a communication link can be established between the receiving terminal and the controller.

In some embodiments, the method can further comprise, before forwarding the target data to the receiving terminal, receiving a data transmission request from the receiving terminal; and establishing a communication link between the controller and the receiving terminal in response to the data transmission request from the receiving terminal. In some instances, forwarding the target data to the ground control apparatus can comprise forwarding the target data to the receiving terminal over the communication link.

In some embodiments, forwarding the target data to the receiving terminal can comprise forwarding the target data to the receiving terminal if the target data is in a specified protocol format.

In some embodiments, receiving, by the controller of the UAV, target data from the transmitting terminal can comprise receiving, by the controller of the UAV, state data from the onboard device of the UAV, the state data representing a current operating state of the onboard device. In some instances, forwarding the target data to the receiving terminal can comprise forwarding the state data to the ground control apparatus.

In some embodiments, the method can further comprise, before forwarding the state data to the ground control apparatus, obtaining a receiving terminal identifier of the state data. In some instances, forwarding the state data to the ground control apparatus can comprise forwarding the state data to the ground control apparatus identified by the receiving terminal identifier.

In some embodiments, the method can further comprise, before receiving, by the controller, the state data from the onboard device of the UAV, receiving a data transmission request from the onboard device; and establishing a data transmission channel between the onboard device and the controller in response to the data transmission request. In some instances, receiving the state data from the onboard device of the UAV can comprise receiving the state data from the onboard device over the data transmission channel.

In some embodiments, a communication link can be established between the ground control apparatus and the controller.

In some embodiments, the method can further comprise, before forwarding the state data to the ground control apparatus, receiving a data transmission request from the ground control apparatus; and establishing a communication link between the controller and the ground control apparatus in response to the data transmission request. In some instances, forwarding the state data to the ground control apparatus can comprise forwarding the state data to the ground control apparatus over the communication link.

In some embodiments, the ground control apparatus can be a mobile terminal.

In some embodiments, receiving the data transmission request from the ground control apparatus can comprise receiving a data transmission request from the mobile terminal through a wireless image transmission module. In some instances, establishing a communication link between the controller and the ground control apparatus in response to the data transmission request can comprise establishing a communication link between the controller and the mobile terminal through the wireless image transmission module in response to the data transmission request.

In some embodiments, receiving, by the controller of the UAV, target data from the transmitting terminal can comprise receiving, by the controller of the UAV, control data from the ground control apparatus, the control data being used to control an operating state of the onboard device of the UAV. In some instances, transmitting the target data to the receiving terminal can comprise forwarding the control data to the onboard device.

In some embodiments, the method can further comprise, before receiving the control data from the ground control apparatus, receiving a data transmission request from the ground control apparatus; and establishing a communication link between the controller and the ground control apparatus in response to the data transmission request. In some instances, receiving the control data from the ground control apparatus can comprise receiving the control data from the ground control apparatus over the communication link.

In some embodiments, the ground control apparatus can be a mobile terminal.

In some embodiments, receiving a data transmission request from the ground control apparatus can comprise receiving a data transmission request from the mobile terminal through a wireless image transmission module, the mobile terminal being connected with the wireless image transmission module over a USB bus. In some instances, establishing a communication link between the controller and the ground control apparatus in response to the data transmission request can comprise establishing a communication link between the controller and the mobile terminal through the wireless image transmission module in response to the data transmission request.

Another aspect of the disclosure provides an apparatus for data transmission. The apparatus can comprise a data receiving unit configured to receive target data from a transmitting terminal, the transmitting terminal being a ground control apparatus or an onboard device of the UAV, the onboard device being connected with the UAV via a universal interface of the UAV, the universal interface being configured to connect various types of onboard devices; and a data forwarding unit configured to forward the target data to a receiving terminal. In some instances, the receiving terminal can be the ground control apparatus or the onboard device, and the receiving terminal can be different from the transmitting terminal.

In some embodiments, the apparatus can further comprise a first request receiving unit configured to receive a data transmission request from the transmitting terminal before the data receiving unit receives the target data; and a channel establishing unit configured to establish a data transmission channel between the transmitting terminal and the controller of the UAV in response to the data transmission request. In some instances, the data receiving unit can comprise a data receiving sub-unit configured to receive the target data from the transmitting terminal over the data transmission channel.

In some embodiments, a communication link can be established between the receiving terminal and the controller.

In some embodiments, the apparatus can further comprise a second request receiving unit configured to receive a data transmission request from the receiving terminal before the data forwarding unit forwards the target data to the receiving terminal; and a link establishing unit configured to establish a communication link between the controller and the receiving terminal in response to the data transmission request from the receiving terminal. In some instances, the data forwarding unit can comprise a data forwarding sub-unit configured to forward the target data to the receiving terminal over the communication link.

In some embodiments, the data receiving unit can be further configured to forward the target data to the receiving terminal if the target data is in a specified protocol format.

In some embodiments, the data receiving unit can comprise a first data receiving unit configured to receive state data from the onboard device of the UAV, the state data representing a current operating state of the onboard device. In some instances, the data forwarding unit can comprise a first data forwarding unit configured to forward the state data to the ground control apparatus.

In some embodiments, the apparatus can further comprise an identifier receiving unit configured to obtain a receiving terminal identifier of the state data before the first data forwarding unit forwards the state data to the ground control apparatus. In some instances, the first data forwarding unit can be further configured to forward the state data to the ground control apparatus identified by the receiving terminal identifier.

In some embodiments, the apparatus can further comprise a device request receiving unit configured to receive a data transmission request from the onboard device before the first data receiving unit receives the target data; and a transmission channel establishing unit configured to establish a data transmission channel between the onboard device and the controller of the UAV in response to the data transmission request. In some instances, the first data receiving unit can comprise a first data receiving sub-unit configured to receive the state data from the onboard device over the data transmission channel.

In some embodiments, a communication link can be established between the ground control apparatus and the controller of the UAV.

In some embodiments, the apparatus can further comprise an apparatus request receiving unit configured to receive a data transmission request from the ground control apparatus before the first data forwarding unit forwards the state data; and a link establishing unit configured to establish a communication link between the controller and the ground control apparatus in response to the data transmission request. In some instances, the first data forwarding unit can comprise a first data forwarding sub-unit configured to forward the state data to the ground control apparatus over the communication link.

In some embodiments, the ground control apparatus can be a mobile terminal

In some embodiments, the apparatus request receiving unit can comprise a terminal request sub-unit configured to receive a data transmission request from the mobile terminal through a wireless image transmission module. In some instances, the link establishing unit can comprise a link establishing sub-unit configured to establish a communication link between the controller and the mobile terminal through the wireless image transmission module in response to the data transmission request.

In some embodiments, the data receiving unit can comprise a second data receiving unit configured to receive control data from the ground control apparatus, the control data being used to control an operating state of the onboard device of the UAV. In some instances, the data forwarding unit can comprise a second data forwarding unit configured to forward the control data to the onboard device.

In some embodiments, the apparatus can further comprise an apparatus request receiving unit configured to receive a data transmission request from the ground control apparatus before the control data from the ground control apparatus is received; and a link establishing unit configured to establish a communication link between the controller and the ground control apparatus in response to the data transmission request. In some instances, the second data receiving unit can comprise a second data receiving sub-unit configured to receive the control data from the ground control apparatus over the communication link.

In some embodiments, the ground control apparatus can be a mobile terminal.

In some embodiments, the apparatus request receiving unit can comprise a terminal request sub-unit configured to receive a data transmission request from the mobile terminal through a wireless image transmission module. In some instances, the mobile terminal can be connected with the wireless image transmission module over a USB bus. In some instances, the link establishing unit can comprise a link establishing sub-unit configured to establish a communication link between the controller and the mobile terminal through the wireless image transmission module in response to the data transmission request.

Another aspect of the disclosure provides an unmanned aerial vehicle (UAV). The UAV can comprise a controller, a storage medium and an onboard device, the onboard device being connected with the UAV via a universal interface of the UAV, the universal interface being configured to connect various types of onboard devices. In some instances, the controller can be configured to receive target data from a transmitting terminal and forward the target data to a receiving terminal, the transmitting terminal being a ground control apparatus or the onboard device, the receiving terminal being the ground control apparatus or the onboard device, the receiving terminal being different from the transmitting terminal. In some instances, the storage medium can be configured to store a program data to be executed by the controller.

Another aspect of the disclosure provides a system for data transmission. The system can comprise an unmanned aerial vehicle (UAV), a transmitting terminal and a receiving terminal. In some instances, the transmitting terminal can be configured to transmit target data to the UAV, the transmitting terminal being a ground control apparatus or an onboard device of the UAV, the onboard device being connected with the UAV via a universal interface of the UAV, the universal interface being configured to connect various types of onboard devices. In some instances, the UAV can be configured to forward the target data to the receiving terminal, the receiving terminal being the ground control apparatus or the onboard device, the receiving terminal being different from the transmitting terminal. In some instances, the receiving terminal can be configured to receive the target data from the UAV.

It can be appreciated from the technical solutions as described hereinabove that, the controller of the UAV can enable a bi-directional data communication between the onboard device of the UAV and the ground control apparatus of the UAV. Therefore, the ground control apparatus can receive a data from the onboard device to learn a controlling status of the onboard device over the UAV or an operating state of the UAV in a timely manner, such that the ground control apparatus can timely recognize a failure of the onboard device and control an operation of the UAV more reliably. In the meantime, the ground control apparatus can transmit a data to the onboard device through the controller of the UAV. Therefore, the ground control apparatus can configure or control the onboard device by transmitting data to the onboard device, such that an operation of the onboard device and a control of the UAV can be reliable.

BRIEF DESCRIPTION OF THE DRAWINGS

Drawings of embodiments of the disclosure will be described for better understanding of the embodiments of the disclosure. It will be apparent that, the drawings merely illustrate exemplary embodiments of the disclosure. Those skilled in the art can conceive other drawings from the motivation of the illustrated drawings without inventive efforts.

DETAILED DESCRIPTION OF THE DISCLOSURE

Embodiments of the disclosure provide a method and an apparatus for data transmission to effect a reliable control of an Unmanned aerial vehicle (UAV).

A better understanding of the disclosure will be obtained by reference to the following detailed description that sets forth illustrative embodiments with reference to the drawings. It will be apparent that, the embodiments described herein are merely provided by way of example only. Those skilled in the art can conceive various embodiments in light of those embodiments disclosed herein without inventive efforts, and all these embodiments are within the scope of the disclosure.

First, a method for data transmission in accordance with the disclosure will be described.

Figure 1:
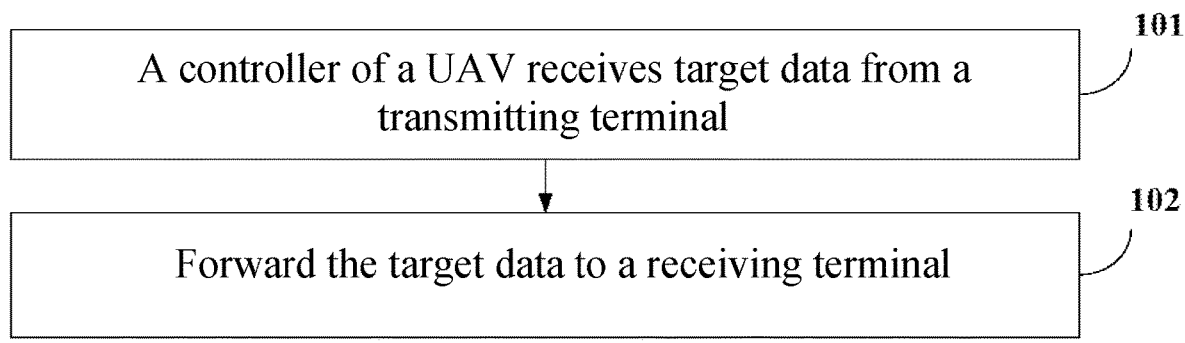
FIG. 1 shows a flow chart of a method for data transmission in accordance with an embodiment of the disclosure.

FIG. 1 shows a flow chart of a method for data transmission in accordance with an embodiment of the disclosure. The method for data transmission in accordance with the embodiment can comprise steps 101 to 102.

In step 101, a controller of a UAV can receive target data from a transmitting terminal.

In some instances, the transmitting terminal can be a ground control apparatus. Optionally, the transmitting terminal can be an onboard device of the UAV.

The onboard device can be a device which is externally connected with the UAV. The onboard device can be connected with the UAV via a universal interface of the UAV. The universal interface can be configured to connect different types of onboard devices. For instance, the onboard device can be a sensor connected with the UAV via the universal interface of the UAV. The sensor can be an image sensor or a temperature sensor.

The ground control apparatus can be a ground apparatus capable of controlling the UAV. The ground control apparatus can transmit control data or a control instruction to the UAV to effect a control of the UAV. For instance, the ground control apparatus can be a mobile terminal. Optionally, the ground control apparatus can be a control apparatus such as a remote controller of a ground station.

In step 102, the target data can be forwarded to a receiving terminal.

In some instances, the receiving terminal can be a ground control apparatus. Optionally, the receiving terminal can be an onboard device connected with the UAV via a universal interface of the UAV. The receiving terminal can be different from the transmitting terminal. For instance, the receiving terminal can be a ground control apparatus while the transmitting terminal can be an onboard device of the UAV.

It will be appreciated that, the ground control apparatus can communicate a data with a controller of the UAV, and the onboard device connected with the UAV via the universal interface of the UAV can also communicate a data with the controller of the UAV. Therefore, the controller of the UAV can enable a bi-directional data communication between the onboard device and the ground control apparatus. The controller, upon receiving target data from the transmitting terminal (e.g., the onboard device or the ground control apparatus), can forward the target data to a corresponding receiving terminal. For instance, in case the transmitting terminal is the onboard device, the controller, upon receiving the target data from the onboard device, can transmit the target data to the ground control apparatus which is the receiving terminal. For instance, in case the transmitting terminal is the ground control apparatus, the controller, upon receiving the target data from the ground control apparatus, can forward the target data to the onboard device which is the receiving terminal.

It will be appreciated that, the controller of the UAV can enable a bi-directional data communication between the onboard device of the UAV and the ground control apparatus of the UAV. Therefore, the ground control apparatus can receive a data from the onboard device to learn a controlling status of the onboard device over the UAV or an operating state of the UAV in a timely manner, such that the ground control apparatus can timely recognize a failure of the onboard device and control an operation of the UAV more reliably. In the meantime, the ground control apparatus can transmit a data to the onboard device through the controller of the UAV. Therefore, the ground control apparatus can configure or control the onboard device by transmitting data to the onboard device, such that an operation of the onboard device and a control of the UAV can be reliable.

In some embodiments, in order to improve a security and reliability of data transmission between the UAV and the transmitting terminal, the transmitting terminal can transmit a data transmission request to the UAV before transmitting the target data to the controller of the UAV. The controller can receive the data transmission request and establish a data transmission channel between the transmitting terminal and the controller in response to the data transmission request. The transmitting terminal can transmit data over the data transmission channel, such that the controller can receive the target data from the transmitting terminal over the data transmission channel.

In some embodiments, in order to effect a data transmission between the onboard device and the ground control apparatus using the controller of the UAV, a control program can be preset in the controller of the UAV. Prior to one of the onboard device and the ground control apparatus transmits data to the other one of the onboard device and the ground control apparatus (e.g., the other one of the onboard device and the ground control apparatus being the receiving terminal), the data transmission request can be transmitted to the controller to call an interface which is available to the control program, such that the UAV can run the control program. Upon receiving the target data from the transmitting terminal via the interface, the controller of the UAV can forward the target data to the receiving terminal.

In some embodiments, a communication link can be established between the controller and the receiving terminal.

In some instances, the controller can receive a data transmission request from the receiving terminal before transmitting the target data to the receiving terminal. The controller can establish a communication link between the controller and the receiving terminal in response to the data transmission request. In this way, the controller can forward the received target data to the receiving terminal over the communication link.

The receiving terminal can transmit the data transmission request to the controller to call an interface which is available to the control program preset in the controller, such that the controller can run the control program to forward the target data from the transmitting terminal to the receiving terminal upon receiving the target data. The process of the receiving terminal transmitting the data transmission request to the controller can be substantially similar to the process of the transmitting terminal transmitting the data transmission request to the controller.

In some embodiments, in order to enable the controller to identify the target data being the data to be forwarded, the target data transmitted from the transmitting terminal can provided in a specified protocol format. Therefore, the controller can forward the target data to the receiving terminal if the controller identifies that the received target data is data in the specified protocol format.

In some embodiments, if the receiving terminal differs from the transmitting terminal, then the target data received by the controller of the UAV can differ, and the processes of the controller forwarding data to the receiving terminal can differ from the process of the controller transmitting date to the transmitting terminal.

In some embodiments, the transmitting terminal can be the onboard device, and the receiving terminal can be the ground control apparatus. The onboard device can be a device connected with the UAV through a universal interface of the UAV.

In some embodiments, the target data to be forwarded, which is transmitted from the transmitting terminal to the controller, can be data sensed by the onboard device (e.g., image information acquired by a sensor) or control data from the onboard device to the controller.

Alternatively, in order to enable a learning of the operating state of the onboard device, the target data transmitted from the onboard device to the controller of the UAV can be state data representing a current operating state of the onboard device. Therefore, a failure or a controlling status of the onboard device can be timely recognized. Consequently, upon receiving the state data from the onboard device, the controller can forward the state data to the ground control apparatus.

It will be appreciated that, a control program of the UAV can be developed by the developer and preset in the onboard device. Once the onboard device is attached to the UAV, the onboard device can effect a control of the UAV using the control program of the UAV. For instance, the onboard device can communicate data with the controller of the UAV through a serial bus to effect a control of the UAV. The operating state of the onboard device can represent a state of the onboard device controlling the UAV. For example, the operating state of the onboard device can include whether or not the onboard device can control the UAV stably, whether or not a program of the onboard device operates abnormally, and whether or not a failure occurs in the onboard device. In this way, the ground control apparatus can analyze the operating state of the onboard device from the obtained state data. The ground control apparatus can timely transmit control data to the onboard device or take the control of UAV over if a failure of the onboard device is detected.

In some embodiments, prior to forwarding the target data to the ground control apparatus, a receiving terminal identifier of the target data can be obtained. In some instances, the target data can comprise the receiving terminal identifier. Optionally, the onboard device can transmit the receiving terminal identifier together with the target data. The controller can forward the target data to the ground control apparatus identified by the receiving terminal identifier by virtue of the receiving terminal identifier. In case of a plurality of ground control apparatuses, the target ground control apparatus of the target data can be accurately determined by identifying the ground control apparatus using the receiving terminal identifier.

It will be appreciated that, in case the transmitting terminal is the onboard device, the onboard device can transmit a data transmission request to the UAV before transmitting the target data to the controller of the UAV. The controller can establish a data transmission channel between the onboard device and the controller in response to the data transmission request, such that the target data can be received from the onboard device over the data transmission channel.

In some embodiments, a communication link can be established between the controller and the ground control apparatus. For instance, the ground control apparatus can transmit a data transmission request to the controller before forwarding the target data to the ground control apparatus, and the controller can establish a communication link between the ground control apparatus and the controller in response to the data transmission request.

The process of establishing the data transmission channel between the controller and the onboard device can be clear with reference to the process of establishing the data transmission channel between the controller and the transmitting terminal as described in the embodiments provided hereinabove. The process of establishing a data link between the controller and the ground control apparatus can be clear with reference to the process of establishing the communication link between the controller and the receiving terminal as described in the embodiments provided hereinabove. A detailed description will not be provided for conciseness.

In some instances, the transmitting terminal can be the onboard device, while the ground control apparatus can be the receiving terminal and can be provided as various types of devices. In some embodiments, the ground control apparatus can be a mobile terminal.

Figure 2:
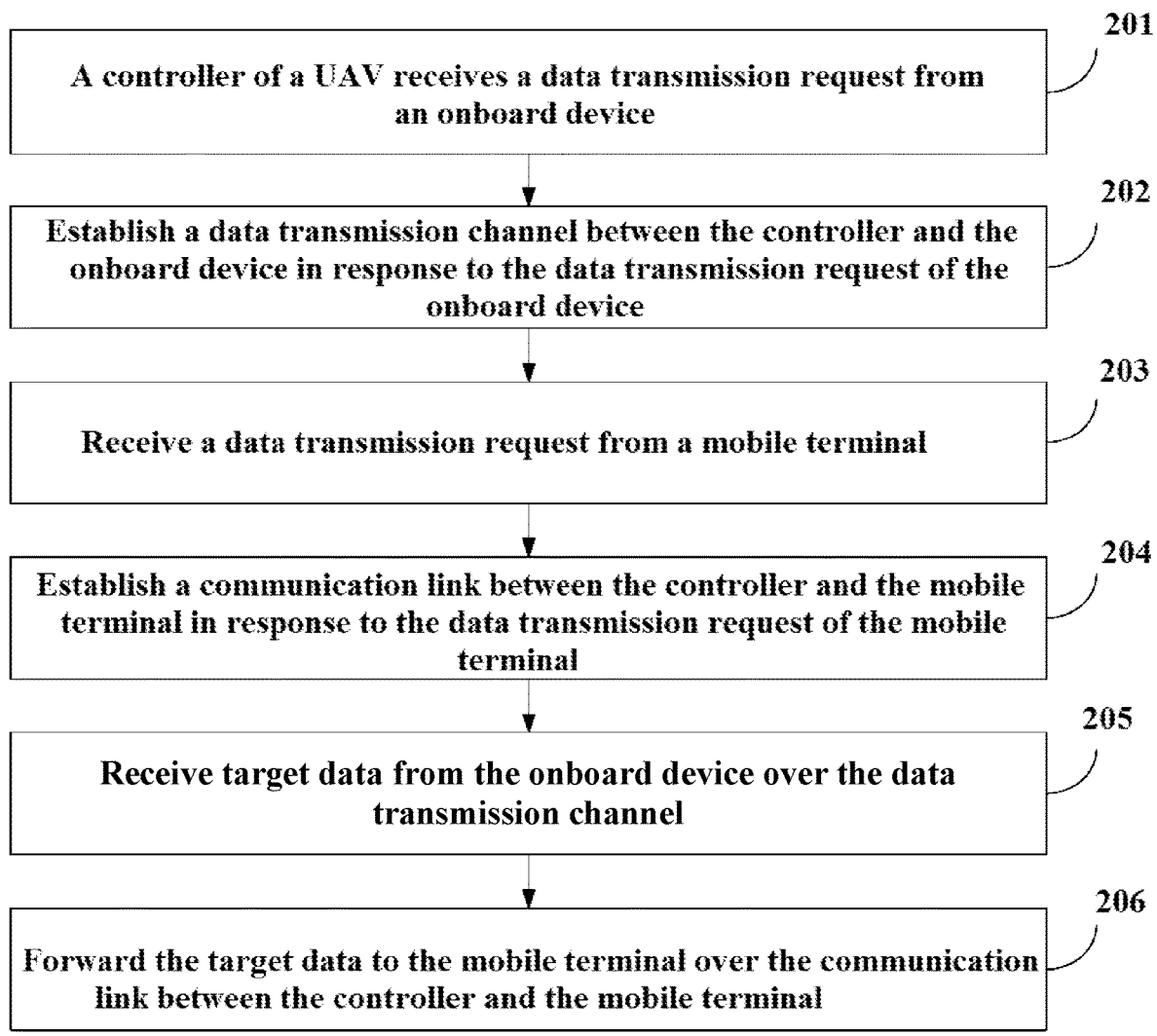
FIG. 2 shows a flow chart of a method for data transmission in accordance with another embodiment of the disclosure.

A method for data transmission in accordance with embodiments of the disclosure will be described, where the transmitting terminal being the onboard device, and the receiving terminal being the mobile terminal. FIG. 2 shows a flow chart of a method for data transmission in accordance with another embodiment of the disclosure. The method can comprise steps 201-206.

In step 201, a controller of a UAV can receive a data transmission request from an onboard device.

The onboard device can be connected with the UAV through a universal interface of the UAV. The universal interface can be configured to connect various types of onboard devices.

In step 202, a data transmission channel can be established between the controller and the onboard device in response to the data transmission request of the onboard device.

In step 203, a data transmission request can be received from a mobile terminal.

In some instances, the mobile terminal can transmit the data transmission request directly to the controller.

Optionally, the mobile terminal can be connected with the controller through a wireless image transmission module. For instance, the mobile terminal can be connected with the wireless image transmission module using a USB bus. The controller can receive the data transmission request from the mobile terminal through the wireless image transmission module, and establish a communication link between the controller and the mobile terminal through the wireless image transmission module in response to the data transmission request.

In step 204, a communication link can be established between the controller and the mobile terminal in response to the data transmission request of the mobile terminal.

In step 205, target data can be received from the onboard device over the data transmission channel.

In some instances, the target data can be state data of the onboard device.

In some embodiments, the target data can be provided with a receiving terminal identifier, such that the target mobile terminal of receiving the target data can be determined using the receiving terminal identifier.

In step 206, the target data can be forwarded to the mobile terminal over the communication link between the controller and the mobile terminal.

In some instances, upon receiving the target data, the ground control apparatus can display the target data. Hence, a user can promptly appreciate the control of the onboard device over the UAV or the operating state of the UAV, so as to find a malfunction of the onboard device. As a result, the operation of the UAV can be more reliably controlled.

It will be appreciated that, steps 201 and 202 and steps 203 and 204 can be performed in a sequence different from that illustrated in FIG. 2. For instance, steps 203 and 204 can be performed before steps 201 and 202. For instance, steps 201 and 202 can be performed concurrently with steps 203 and 204.

It will be appreciated that, in case the transmitting terminal is the onboard device, once the establishing the data transmission channel between the onboard device and the controller and the communication link between the ground control apparatus and the onboard device, the controller can receive both the target data from the onboard device (e.g., the onboard device is the transmitting terminal) and the target data from the ground control apparatus (e.g., the ground control apparatus is the transmitting terminal), and forward the target data from the ground control apparatus to the onboard device. In this way, the onboard device and the ground control apparatus can exchange data with each other through the controller.

A description will be provided to an example where the ground control apparatus being the transmitting terminal and the onboard device being the receiving terminal.

The target data can be transmitted from the ground control apparatus to the controller in various manners. In some embodiments, the ground control apparatus can transmit control data to the controller, the control data being used to control an operating state of the onboard device of the UAV. The controller can forward the control data to the onboard device to control the operation of the onboard device in accordance with the control data. For instance, the control data can be an operational configuration data of the onboard device which is used to configure a program of the onboard device.

Prior to the controller receiving the control data from the ground control apparatus, the ground control apparatus can transmit a data transmission request to the controller. The controller can establish a communication link between the controller and the ground control apparatus in response to the received data transmission request, such that the ground control apparatus can transmit target data (e.g., the control data) to the controller over the communication link. The processing of data communication in the example where the transmitting terminal being the ground control apparatus can be substantially similar to the process of data communication in the example where the transmitting terminal being the onboard device.

The process of the controller receiving the data transmission request and establishing a communication link can be clear with reference to the process described in the embodiments provided hereinabove. A detailed description will not be provided for conciseness.

In some embodiments, in case the ground control apparatus is the transmitting terminal, the ground control apparatus can be a mobile terminal.

Figure 3:
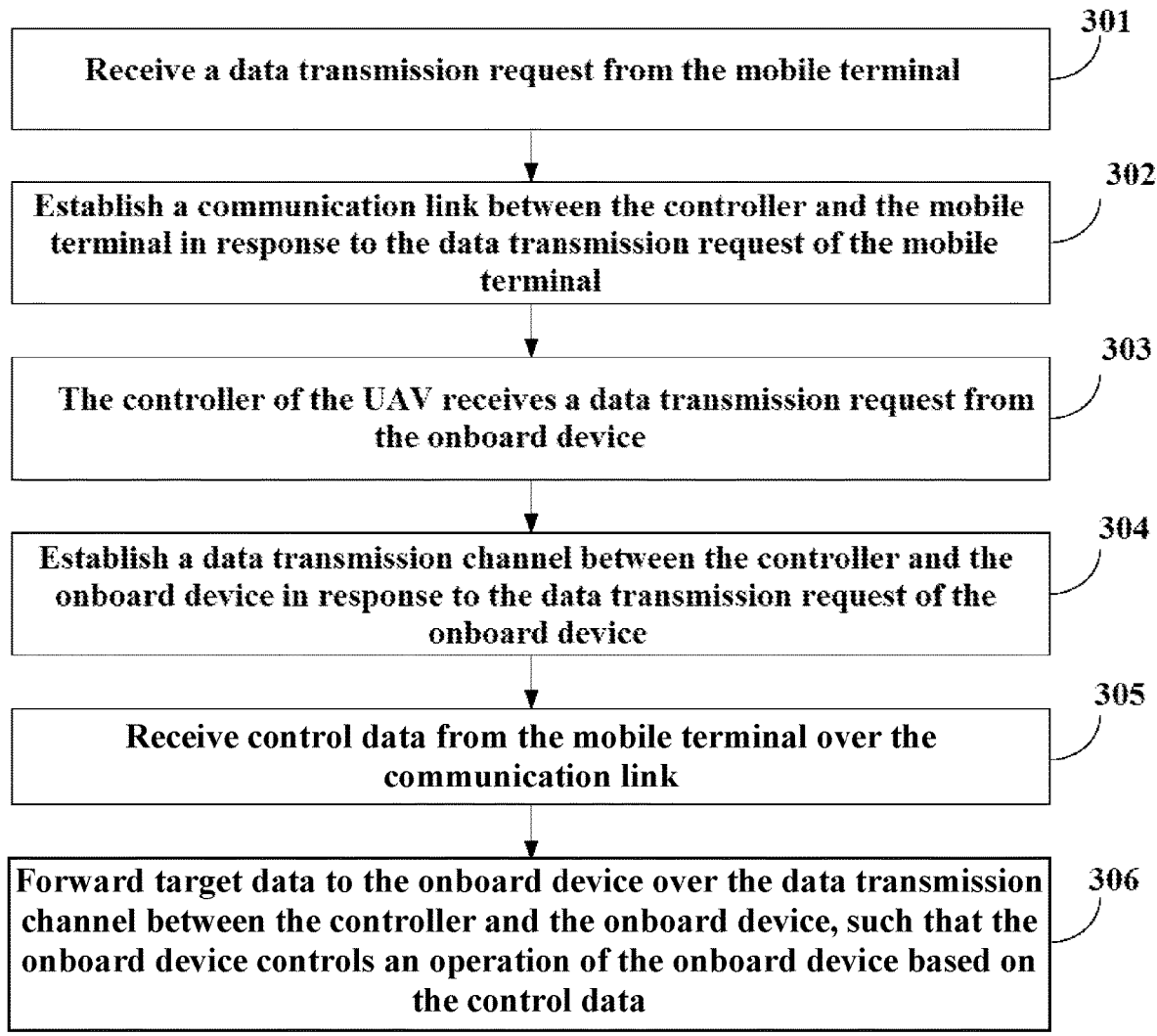
FIG. 3 shows a flow chart of a method for data transmission in accordance with still another embodiment of the disclosure.

A method for data transmission in accordance with embodiments of the disclosure will be described, where the ground control apparatus being the mobile terminal, and the target data transmitted from the mobile terminal to the controller being the control data. FIG. 3 shows a flow chart of a method for data transmission in accordance with still another embodiment of the disclosure. The method can comprise steps 301-306.

In step 301, a data transmission request can be received from the mobile terminal.

The mobile terminal can transmit the data transmission request directly to the controller.

In some instances, the mobile terminal can be connected with the controller through a wireless image transmission module. For instance, the mobile terminal can be connected with the wireless image transmission module over a USB bus. The controller can receive the data transmission request from the mobile terminal through the wireless image transmission module, and establish a communication link between the controller and the mobile terminal through the wireless image transmission module in response to the data transmission request.

In step 302, a communication link can be established between the controller and the mobile terminal in response to the data transmission request of the mobile terminal.

In step 303, the controller of the UAV can receive a data transmission request from the onboard device.

The onboard device can be connected with the UAV through a universal interface of the UAV. The universal interface can be configured to connect various types of onboard devices.

In step 304, a data transmission channel can be established between the controller and the onboard device in response to the data transmission request of the onboard device.

In some embodiments, steps 303 and 304 can be optional.

In step 305, control data can be received from the mobile terminal over the communication link.

In some instances, the control data can be provided with a receiving terminal identifier, such that the target onboard device of receiving the control data can be determined using the receiving terminal identifier. The control data can be provided with the receiving terminal identifier regardless of a type of the control data, such that the target onboard device of receiving the target data can be determined using the receiving terminal identifier.

In step 306, the control data can be forwarded to the onboard device over the data transmission channel between the controller and the onboard device, such that the onboard device can control an operation of the onboard device based on the control data.

In some embodiments, the onboard device can transmit target data such as state data to the controller over the data transmission channel while the mobile terminal transmitting the control data to the controller. Therefore, the controller can forward the target data of the onboard device to the mobile terminal, enabling a bidirectional data communication between the onboard device and the mobile terminal.

It will be appreciated that, in case the transmitting terminal is the ground control apparatus such as the mobile terminal, the target data transmitted from the ground control apparatus to the controller can be provided in a specified protocol format, such that the controller can identify that the received data is to be forwarded.

Another aspect of the disclosure provides an apparatus for data transmission in correspondence to the method for data transmission of the disclosure.

Figure 4:
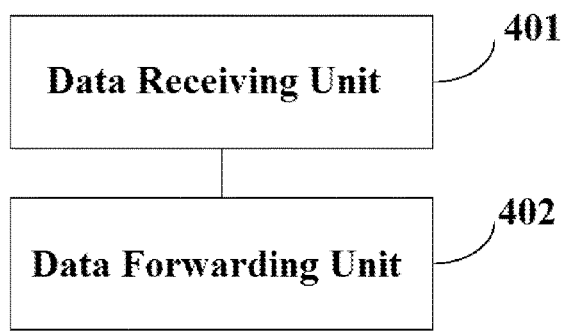
FIG. 4 shows a configuration of an apparatus for data transmission in accordance with an embodiment of the disclosure.

FIG. 4 shows a configuration of an apparatus for data transmission in accordance with an embodiment of the disclosure. The apparatus for data transmission in accordance with the embodiment can comprise a data receiving unit 401 and a data forwarding unit 402.

The data receiving unit 401 can be configured to receive target data from a transmitting terminal. In some instances, the transmitting terminal can be a ground control apparatus. Optionally, the transmitting terminal can be an onboard device of the UAV. The onboard device can be connected with the UAV via a universal interface of the UAV. The universal interface can be configured to connect various types of onboard devices.

The data forwarding unit 402 can be configured to forward the target data to a receiving terminal. In some instances, the receiving terminal can be the ground control apparatus or the onboard device, and the receiving terminal can be different from the transmitting terminal.

It will be appreciated that, the controller of the UAV can enable a bi-directional data communication between the onboard device of the UAV and the ground control apparatus of the UAV. Therefore, the ground control apparatus can receive a data from the onboard device to learn a controlling status of the onboard device over the UAV or an operating state of the UAV in a timely manner, such that the ground control apparatus can timely recognize a failure of the onboard device and control an operation of the UAV more reliably. In the meantime, the ground control apparatus can transmit a data to the onboard device through the controller of the UAV. Therefore, the ground control apparatus can configure or control the onboard device by transmitting data to the onboard device, such that an operation of the onboard device and a control of the UAV can be reliable.

In some embodiments, the apparatus for data transmission can further comprise a first request receiving unit configured to receive a data transmission request from the transmitting terminal before the data receiving unit receives the target data, and a channel establishing unit configured to establish a data transmission channel between the transmitting terminal and the controller of the UAV in response to the data transmission request. The data receiving unit can comprise a data receiving sub-unit configured to receive the target data from the transmitting terminal over the data transmission channel.

In some embodiments, a communication link can be established between the receiving terminal and the controller.

In some embodiments, the apparatus can further comprise a second request receiving unit configured to receive a data transmission request from the receiving terminal before the data forwarding unit forwards the target data to the receiving terminal, and a link establishing unit configured to establish a communication link between the controller and the receiving terminal in response to the data transmission request from the receiving terminal. The data forwarding unit can comprise a data forwarding sub-unit configured to forward the target data to the receiving terminal over the communication link.

In some embodiments, the data receiving unit can be configured to forward the target data to the receiving terminal if the target data is in a specified protocol format.

In some embodiments, the transmitting terminal can be the onboard device. The data receiving unit can comprise a first data receiving unit configured to receive state data from the onboard device of the UAV, where the state data representing a current operating state of the onboard device. The data forwarding unit can comprise a first data forwarding unit configured to forward the state data to the ground control apparatus.

In an embodiment where the transmitting terminal is the onboard device, the apparatus can further comprise an identifier receiving unit configured to obtain a receiving terminal identifier of the state data before the first data forwarding unit forwards the state data to the ground control apparatus. The first data forwarding unit can be configured to forward the state data to the ground control apparatus identified by the receiving terminal identifier.

In an embodiment where the transmitting terminal is the onboard device, the apparatus can further comprise a device request receiving unit configured to receive a data transmission request from the onboard device before the first data receiving unit receives the target data, and a transmission channel establishing unit configured to establish a data transmission channel between the onboard device and the controller of the UAV in response to the data transmission request. The first data receiving unit can comprise a first data receiving sub-unit configured to receive the state data from the onboard device over the data transmission channel.

In some embodiments, a communication link can be established between the ground control apparatus and the controller of the UAV.

In some embodiments, before the state data can be forwarded to the ground control apparatus, the apparatus can further comprise an apparatus request receiving unit configured to receive a data transmission request from the ground control apparatus before the first data forwarding unit forwards the state data, and a link establishing unit configured to establish a communication link between the controller and the ground control apparatus in response to the data transmission request. The first data forwarding unit can comprise a first data forwarding sub-unit configured to forward the state data to the ground control apparatus over the communication link.

In some embodiments, the ground control apparatus can be a mobile terminal.

In an embodiment where the ground control apparatus is the mobile terminal, the apparatus request receiving unit can comprise a terminal request receiving sub-unit configured to receive a data transmission request from the mobile terminal through a wireless image transmission module. The link establishing unit can comprise a link establishing sub-unit configured to establish a communication link between the controller and the mobile terminal through the wireless image transmission module in response to the data transmission request.

In another embodiment, the transmitting terminal can be the ground control apparatus. The data receiving unit can comprise a second data receiving unit configured to receive control data from the ground control apparatus, where the control data being used to control an operating state of the onboard device of the UAV. The data forwarding unit can comprise a second data forwarding unit configured to forward the control data to the onboard device.

In an embodiment where the transmitting terminal is the ground control apparatus, the apparatus can further comprise an apparatus request receiving unit configured to receive a data transmission request from the ground control apparatus before the control data from the ground control apparatus is received, and a link establishing unit configured to establish a communication link between the controller and the ground control apparatus in response to the data transmission request. The second data receiving unit can comprise a second data receiving sub-unit configured to receive the control data from the ground control apparatus over the communication link.

In an embodiment where the transmitting terminal is the ground control apparatus, the ground control apparatus can be a mobile terminal.

In some embodiments, the apparatus request receiving unit can comprise a terminal request sub-unit configured to receive a data transmission request from the mobile terminal through a wireless image transmission module, where the mobile terminal being connected with the wireless image transmission module over a USB bus. The link establishing unit can comprise a link establishing sub-unit configured to establish a communication link between the controller and the mobile terminal through the wireless image transmission module in response to the data transmission request.

Another aspect of the disclosure provides an unmanned aerial vehicle (UAV).

Figure 5:
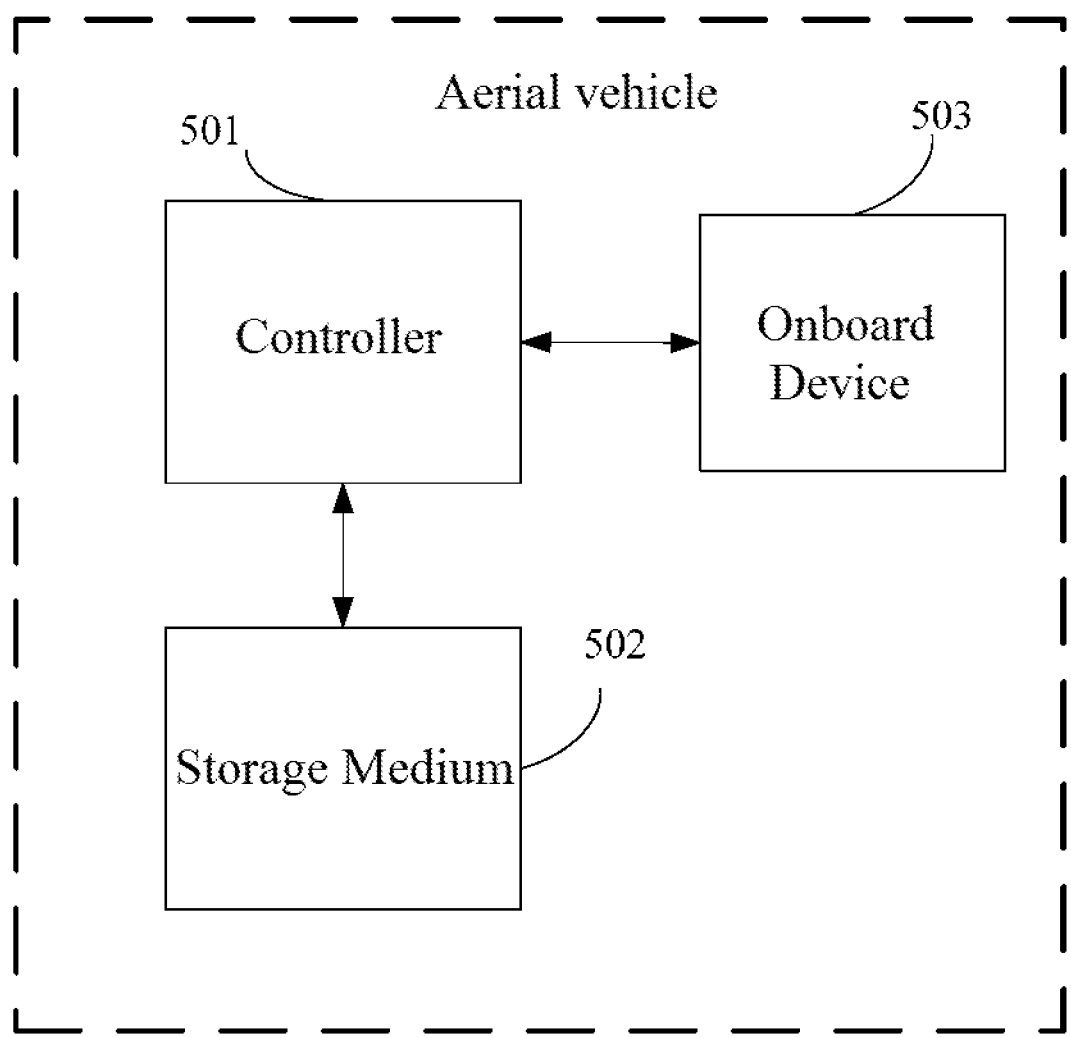
FIG. 5 shows a configuration of an aerial vehicle in accordance with an embodiment of the disclosure.

FIG. 5 shows a configuration of an aerial vehicle in accordance with an embodiment of the disclosure. The UAV can comprise a controller 501, a storage medium 502 and an onboard device 503. In some embodiments, the onboard device 503 can be connected with the UAV via a universal interface of the UAV, the universal interface being configured to connect various types of onboard devices.

In some embodiments, the controller 501 can be configured to receive target data transmitted from a transmitting terminal, and forward the target data to a receiving terminal. In some embodiments, the transmitting terminal can be a ground control apparatus or the onboard device as described hereinabove.

The storage medium 502 can be configured to store program data to be executed by the controller.

It will be appreciated that, the UAV can further comprise various apparatuses including an onboard device built in the UAV and a communication bus through which the controller and the storage medium are connected.

Still another aspect of the disclosure provides a system for data transmission. The system for data transmission can comprise a UAV, a transmitting terminal and a receiving terminal.

In some embodiments, the transmitting terminal can be configured to transmit target data to the UAV. The transmitting terminal can be a ground control apparatus or an onboard device of the UAV. The onboard device can be connected with the UAV via a universal interface of the UAV, the universal interface being configured to connect various types of onboard devices.

The UAV can be configured to forward the target data to the receiving terminal. The receiving terminal can be the ground control apparatus or the onboard device, the receiving terminal being different from the transmitting terminal.

The receiving terminal can be configured to receive the target data transmitted from the UAV.

Embodiments of the disclosure are described in a progressive manner. Each embodiment focuses on a difference over other embodiments. The same or similar aspects of the embodiments can be clear by referring to each other. The devices disclosed in the embodiments may correspond to the method as disclosed in the embodiments. Therefore, a detailed description of the devices may be omitted for conciseness. The devices can be clear to those skilled in the art by referring to the methods of the disclosure.

It will be apparent to those skilled in the art that, units and steps of the disclosed embodiments can be implemented by an electronic hardware, a computer software or a combination thereof. A function of the units and steps of disclosed embodiments can be generally described in the disclosure to illustrate an interchangeability between a hardware and a software. A function can be implemented by either a hardware or a software, depending on the specific application and the designed constraint of a technical solution. A specific application can be implemented in various ways without departing from the scope of the disclosure.

Methods or algorithms described in embodiments of the disclosure can be implemented with a hardware, a software module executed by a processor, or a combination thereof. The software module can be stored in a random access memory (RAM), an internal memory, a read-only memory (ROM), an electrically-programmable ROM, an electrically-erasable programmable ROM, a register, a hard disk, a removable disk, a CD-ROM or a storage medium of any other forms known in the art.

Embodiments are disclosed to enable those skilled in the art to implement or use the disclosure. Various modifications to the embodiments can be apparent to those skilled in the art. The general principles as defined herein can be implemented in other embodiments without departing from the spirit or scope of the disclosure. The disclosure can be not intended to be limited to the illustrated embodiments but can be interpreted as the widest scope consistent with the principles and novel features as disclosed.

What is claimed is:

1. A method for data transmission comprising:
    receiving a data transmission request from a transmitting terminal;
    establishing a communication link between a controller of an unmanned aerial vehicle (UAV) and the transmitting terminal in response to the data transmission request;
    receiving, by the controller of the UAV, target data from the transmitting terminal over the communication link, wherein:
        the UAV is configured to carry an onboard device connected with the UAV via a universal interface of the UAV,
        the onboard device is configured to, in response to being attached to the UAV, effect a control of the UAV using a control program preset in the onboard device and collect state data of the onboard device, the state data indicating an operational state of the onboard device controlling the UAV, and
        the universal interface is configured to connect onboard devices of various types; and
    forwarding the target data to a receiving terminal, including:
        in response to the controller receiving the target data that includes the state data of the onboard device from the onboard device, forwarding, through the controller of the UAV, the state data to a ground control apparatus for the ground control apparatus to analyze the state data to determine the operational state of the onboard device and, based on the operational state, generate control data configured to control an operation of the onboard device, the ground control apparatus including a mobile terminal, and
        in response to the controller receiving the target data that includes the control data from the ground control apparatus, forwarding, through the controller of the UAV, the control data to the onboard device.

2. The method of claim 1, wherein:
    receiving, by the controller of the UAV, the target data from the transmitting terminal includes receiving, by the controller of the UAV, the state data from the onboard device of the UAV.

3. The method of claim 2, wherein:
    receiving the data transmission request from the transmitting terminal includes receiving the data transmission request from the onboard device;
    establishing the communication link between the controller and the transmitting terminal in response to the data transmission request includes establishing a data transmission channel between the onboard device and the controller in response to the data transmission request; and
    receiving the state data from the onboard device of the UAV includes receiving the state data from the onboard device over the data transmission channel.

4. The method of claim 1, further comprising, before forwarding the state data to the ground control apparatus:
    receiving a data transmission request from the ground control apparatus; and
    establishing a communication link between the controller and the ground control apparatus in response to the data transmission request,
    wherein forwarding the state data to the ground control apparatus includes forwarding the state data to the ground control apparatus over the communication link.

5. The method of claim 4, wherein:
    receiving the data transmission request from the ground control apparatus includes receiving the data transmission request from the mobile terminal through a wireless image transmission module; and
    establishing the communication link between the controller and the ground control apparatus in response to the data transmission request includes establishing the communication link between the controller and the mobile terminal through the wireless image transmission module in response to the data transmission request.

6. The method of claim 1, wherein:
    receiving, by the controller of the UAV, the target data from the transmitting terminal includes receiving, by the controller of the UAV, the control data from the ground control apparatus.

7. The method of claim 6, wherein:
    the data transmission request from the transmitting terminal includes receiving a data transmission request from the ground control apparatus;
    establishing the communication link between the controller and the transmitting terminal in response to the data transmission request includes establishing a communication link between the controller and the ground control apparatus in response to the data transmission request and receiving the control data from the ground control apparatus includes receiving the control data from the ground control apparatus over the communication link.

8. The method of claim 7, wherein:

receiving the data transmission request from the ground control apparatus includes receiving the data transmission request from the mobile terminal through a wireless image transmission module, the mobile terminal being connected with the wireless image transmission module over a USB bus; and establishing the communication link between the controller and the ground control apparatus in response to the data transmission request includes establishing a communication link between the controller and the mobile terminal through the wireless image transmission module in response to the data transmission request.

9. An apparatus for data transmission comprising:

a controller; and a storage medium coupled to the controller and storing a program that, when executed by the controller, causes the controller to:

receive a data transmission request from a transmitting terminal;

establish a communication link between the controller and the transmitting terminal in response to the data transmission request;

receive target data from the transmitting terminal over the communication link, wherein:

the apparatus is configured to carry an onboard device connected with the apparatus via a universal interface of the apparatus, the onboard device is configured to, in response to being attached to the apparatus, effect a control of the apparatus using a control program preset in the onboard device and collect state data of the onboard device, the state data indicating an operational state of the onboard device controlling the apparatus, and universal interface is configured to connect onboard devices various types; and forward the target data to a receiving terminal, including:

in response to the controller receiving the target data that includes the state data of the onboard device from the onboard device, forwarding, through the controller of the apparatus, the target data to a ground control apparatus for the ground control apparatus to analyze the state data to determine the operational state of the onboard device and, based on the operational state, generate control data configured to control an operation of the onboard device, the ground control apparatus including a mobile terminal, and response to the controller receiving the target data that includes the control data from the ground control apparatus, forwarding, through the controller of the apparatus, the control data to the onboard device.

10. The apparatus of claim 9, wherein the program further causes the controller to:

receive the state data from the onboard device of the apparatus as the target data.

11. The apparatus of claim 10, wherein the program further causes the controller to, before receiving the state data from the onboard device of the apparatus:

receive a data transmission request from the onboard device;

establish a data transmission channel between the onboard device and the controller in response to the data transmission request; and receive the state data from the onboard device over the data transmission channel.

12. The apparatus of claim 10, wherein the program further causes the controller to, before forwarding the state data to the ground control apparatus:

receive a data transmission request from the ground control apparatus;

establish a communication link between the controller and the ground control apparatus in response to the data transmission request; and forward the state data to the ground control apparatus over the communication link.

13. The apparatus of claim 12, wherein the program further causes the controller to:

receive the data transmission request from the mobile terminal through a wireless image transmission module; and establish the communication link between the controller and the mobile terminal through the wireless image transmission module in response to the data transmission request.

14. The apparatus of claim 9, wherein the program further causes the controller to:

receive the control data from the ground control apparatus as the target data.

15. The apparatus of claim 14, wherein the program further causes the controller to, before receiving the control data from the ground control apparatus:

receive a data transmission request from the ground control apparatus;

establish a communication link between the controller and the ground control apparatus in response to the data transmission request; and receive the control data from the ground control apparatus over the communication link.

16. The apparatus of claim 14, wherein the program further causes the controller to:

receive the data transmission request from the mobile terminal through a wireless image transmission module, the mobile terminal being connected with the wireless image transmission module over a USB bus; and establishing a communication link between the controller and the mobile terminal through the wireless image transmission module in response to the data transmission request.

17. The method of claim 1, wherein:

the control program is a first control program; and the method further comprises:

in response to the data transmission request, calling an available interface to run a second control program preset in the controller, the available interface being configured to receive data to be forwarded by the controller;

wherein:

the state data of the onboard device is received by the controller through the available interface and is forwarded to the ground control apparatus, and the control data is received by the controller through the available interface and is forwarded to the onboard device.

\* \* \* \* \*